(12) United States Patent
Banerjee et al.

(10) Patent No.: US 10,282,250 B1
(45) Date of Patent: May 7, 2019

(54) APPARATUS AND METHOD FOR A COHERENT, EFFICIENT, AND CONFIGURABLE CYCLIC REDUNDANCY CHECK RETRY IMPLEMENTATION FOR SYNCHRONOUS DYNAMIC RANDOM ACCESS MEMORY

(71) Applicant: Cadence Design Systems, Inc., San Jose, CA (US)

(72) Inventors: Bikram Banerjee, Bangalore (IN); Anne Rodgers Hughes, Austin, TX (US); John Michael MacLaren, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/808,852

(22) Filed: Nov. 9, 2017

Related U.S. Application Data

(60) Provisional application No. 62/573,112, filed on Oct. 16, 2017.

(51) Int. Cl.
| | |
|---|---|
| *G06F 11/00* | (2006.01) |
| *G11C 29/00* | (2006.01) |
| *G06F 11/10* | (2006.01) |
| *G06F 3/06* | (2006.01) |

(52) U.S. Cl.
CPC ........ *G06F 11/1004* (2013.01); *G06F 3/0619* (2013.01); *G06F 3/0659* (2013.01); *G06F 3/0685* (2013.01)

(58) Field of Classification Search
CPC .. G06F 11/1004; G06F 3/0619; G06F 3/0659; G06F 3/0685
USPC .......................... 714/763, 768, 761, 814, 815
See application file for complete search history.

(56) References Cited

U.S. PATENT DOCUMENTS

| | | | |
|---|---|---|---|
| 2006/0156203 A1* | 7/2006 | Naoi ....................... | H04L 1/188 714/776 |
| 2015/0082111 A1* | 3/2015 | Uchida .............. | G06K 7/10237 714/748 |
| 2018/0018217 A1* | 1/2018 | Cordero .............. | G06F 11/1004 |

\* cited by examiner

*Primary Examiner* — Christine T. Tu
(74) *Attorney, Agent, or Firm* — Vista IP Law Group, LLP

(57) ABSTRACT

Embodiments of the invention provide an apparatus and method for a coherent, efficient, and configurable cyclic check redundancy retry implementation for synchronous dynamic random access memory. The process includes storing write commands as groups of bursts in a storage location where those commands are stored at least until a time frame has passed for receiving a corresponding cyclic redundancy check failure message. In some embodiments, the process includes retrying corresponding groups of bursts after receiving a failure message where retried groups of bursts are given priority over other memory access commands. In some embodiments, when a read command is received corresponding to a write command that is not beyond the relevant time frame the read command will also be held back from execution until the corresponding time frame has passed without notification of cyclic redundancy check value failure.

20 Claims, 6 Drawing Sheets

APPARATUS AND METHOD FOR A COHERENT, EFFICIENT, AND CONFIGURABLE CYCLIC REDUNDANCY CHECK RETRY IMPLEMENTATION FOR SYNCHRONOUS DYNAMIC RANDOM ACCESS MEMORY

FIELD

This disclosure relates to the field of memory controllers.

BACKGROUND

Modern electronics rely heavily on memory. This is because memory is central to a vast majority of computing operations. For instance, running an application on a device, such as a cell phone, a tablet, personal computer or other devices, will require the utilization of memory. This memory can be in the form of persistent storage, such as solid state drives (SSDs), hard disk drives (HDDs), or even tape drives. However, persistent storage tends to be slower than non-persistent storage such as random access memory (RAM).

However, simply implementing DRAM is insufficient to continue to meet ongoing and ever advancing computing demands. Thus, to improve throughput of memory devices including DRAMs, the speed at which these devices communicate continues to increase. Unfortunately, increasing the speed with which a DRAM device operates alone causes undesirable problems. One problem is an increased likelihood that signal noise or some other factor will cause the incorrect transmission of signals between a memory accessing apparatus and a memory device. In this regard, the DRAM specification for DDR4 (fourth generation double data rate DRAM) specifies support for cyclic redundancy checking at a DDR4 memory apparatus against a cyclic redundancy check value appended to the end of a burst write transmission.

Upon completion of a burst command the memory will compute a cyclic redundancy check value, and compare that with the received redundancy check value. If the received and the computed redundancy check values do not match, the memory will send a notification to the requesting apparatus indicating that cyclic redundancy check failed and thus that there was an error in transmission.

Unfortunately, even though memory devices that comply with the DRAM specification will provide a notification of an error, conventional implementations are unable to pinpoint the specific burst command that had failed to pass the cyclic redundancy check.

Therefore, what is need is an approach to address the shortcomings of memory devices such as those constructed to be compliant with the DDR4 specification.

SUMMARY

Embodiments of the invention provide an apparatus and method for a coherent, efficient, and configurable cyclic check redundancy retry implementation for synchronous dynamic random access memory. Generally, the approach includes storing write commands as groups of bursts in a caching location where those commands are stored at least until a time frame has passed for receiving a corresponding failure message. For instance, the time frame can be determined using time-based analysis techniques such as a sliding time window corresponding to an earliest possible receipt time and a latest possible receipt time of a failure message. Furthermore, the approach includes retrying corresponding groups of bursts after receiving the failure message which comprises halting the otherwise normal operation of the memory controller's issuance/execution of memory access commands to give priority to the groups of bursts being retried. Additionally, in the event of a normally completed write operation, any corresponding completion messages are held back from transmission until the sliding time window has expired without notification of a cyclic redundancy check failure, or in the alternative is replaced with a failure message after some maximum number of retry attempts have completed without success. In another aspect, when a read command corresponds to a write command that is not beyond the sliding time window the read command will also be held back from execution until the sliding time window has passed the corresponding write command without notification of cyclic redundancy check value failure. In some embodiments, a configuration retry cache is used for storing groups of bursts, wherein the retry cache is configurable to hold different numbers of entries and different arrangements of entries.

BRIEF DESCRIPTION OF THE DRAWINGS

In order that the present invention is better understood, some embodiments of the invention will now be described, by way of example only, with reference to the accompanying drawings.

DETAILED DESCRIPTION

Various embodiments will now be described in detail with reference to the drawings, which are provided as illustrative examples of the invention to enable those skilled in the art to practice the invention. Notably, the figures and the examples are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As will be discussed further below, the present disclosure provides a memory controller to manage a retry process. The memory controller maintains groups of bursts corresponding to write requests after the groups have been executed but prior to receiving cyclic retry check failures messages, uses time-based analysis techniques to determine stored burst groups corresponding to particular failure messages, and retries those stored burst groups when a retry threshold has not been exceeded.

Figure 1:
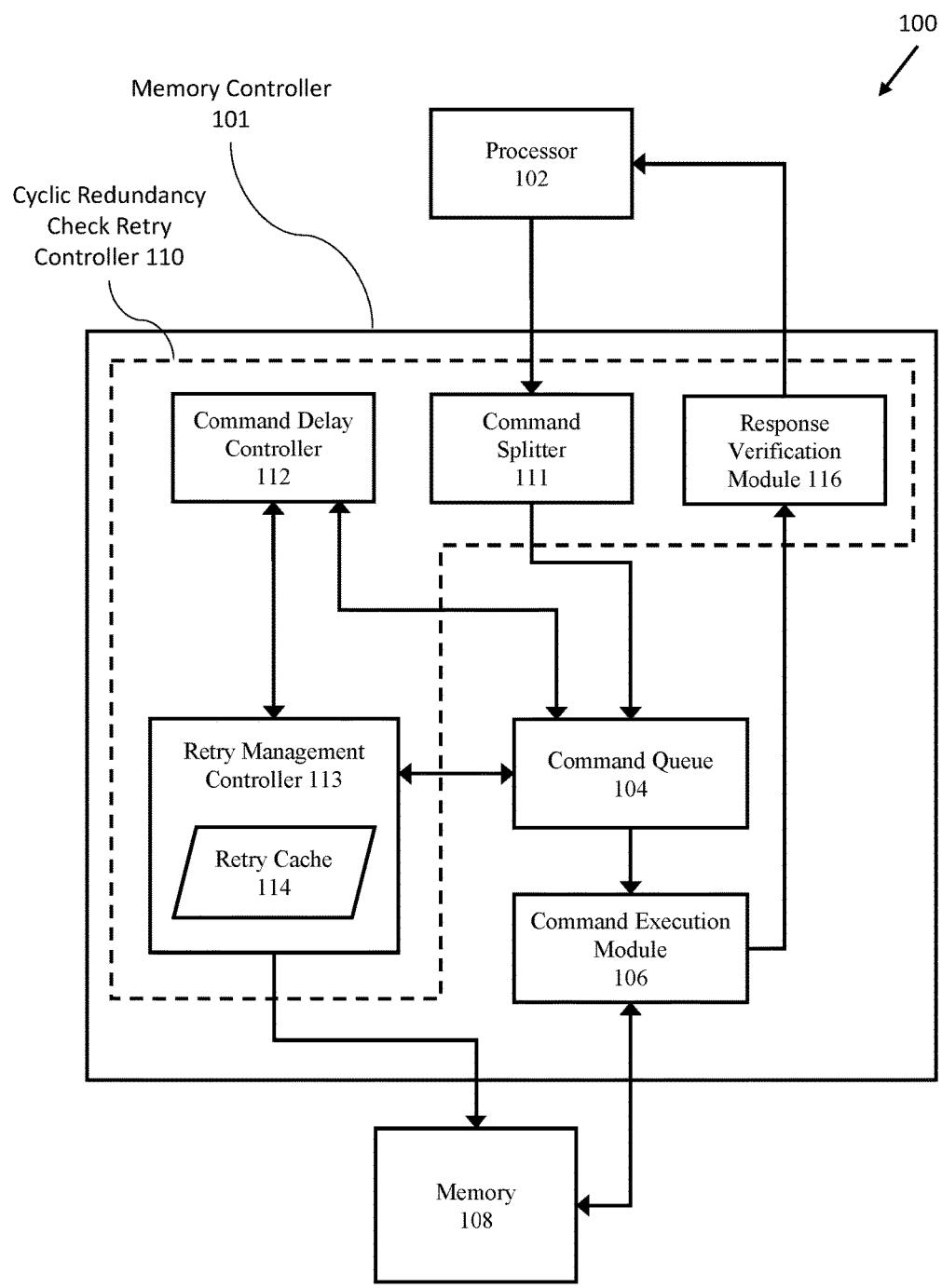
FIG. 1 illustrates an example apparatus including a memory controller in which some embodiments of the invention may be implemented.

FIG. 1 illustrates an example apparatus including a memory controller in which some embodiments of the invention may be implemented. The apparatus includes the recited memory controller, which may be connected to one or more memory accessing devices (e.g. processors) and to a memory respectively for providing memory access.

The apparatus 100, as illustrated, includes a processor 102, a memory controller 106, and a memory 108. The memory controller 106 is electrically coupled between the processor 102 and the memory 108. Generally, the memory controller is coupled over one or more busses to the processing device on one side, and over at least a second bus to a memory on the other side. However, to maintain the understandability of FIG. 1 the aforementioned busses have not been expressly illustrated. The memory controller 101 includes a command queue 104, a command execution module 106, and a cyclic redundancy check retry controller 110. The cyclic redundancy check retry controller (CRCRC) includes a number of components that will be discussed more thoroughly below. However, briefly the components of the CRCRC perform various functions to manage and implement a retry process and includes a command splitter 111, a command delay controller 112, a response verification module 116, and a retry management controller 113 with a corresponding retry cache.

In some embodiments, a processor 102 is connected to the memory controller without intervening components as illustrated. In some embodiments, the processor may be connected to the memory controller through various intervening elements, such as bus controller logic, buffers, or direct memory access (DMA) modules. In some embodiments, the processor is constructed upon the same semiconductor substrate, within the same chip package, or separately from the memory controller and/or the memory 108. Furthermore, the processor 102 is only one possible component that may interface with the memory controller 101. For example, a DMA engine, a modem, or any other device that is configured to interface with a memory controller as illustrated may be included in addition to or in place of the processor. Regardless of what form the interfacing device takes these devices all interface using one or more read/write commands, and in some circumstances, receive corresponding success or failure messages in response to read or write commands. For example, as provided in the illustration, the processor 102 transmits one or more commands to the command splitter 111 and receives one or more responses from the response verification module 116.

The command splitter 111 performs at least two functions. The first and simplest function is to pass received read commands to the command queue 104 without splitting the read command into a plurality of read commands. The second function is to separate large write commands into a plurality of smaller write commands. These smaller write commands correspond to subsets of the larger write command. For instance, the write commands may be separated into groups of bursts such as 4, 8, or 16 bursts. As will be discussed in more detail subsequently, the size of the resulting operations corresponds to a compromise between efficient use of the limited number of entries in the command queue and the ability to resolve a group of bursts to a sliding time window. Regardless, once a write command is split into groups of bursts (e.g. 4 groups of 8 bursts) the groups of bursts can be transmitted to the command queue.

The command queue 104 comprises separate or combined entries for issuing read and write commands. In some embodiments, the entries correspond to separate address and data storage locations where the address corresponds to the location to be read or written to and to one or more data flags specifying the type of transaction and any other relevant characteristic. Furthermore, in some embodiments, the command queue 104 includes one or more reserved entries for use by the CRCRC 110, wherein the CRCRC can pause the otherwise normal operation of the command queue 104 and insert one or more write commands to be retried prior to continuing the execution of the commands already in the command queue. Additionally, the command queue 104 is connected to a command delay controller 112 where the command delay controller 112, under certain circumstances, instructs the command queue to hold back one or more read or write operations as will be discussed below.

The command execution module 106 receives read and write commands from the command queue and performs the necessary operations to complete the commands, such as transmitting a command sequence on a memory bus, and placing/receiving the appropriate data on/from the memory bus. Furthermore, the command execution module is connected to the memory to exchange one or more success or completion messages and to receive any corresponding messages indicating a CRC failure. If command execution module receives such a message, that message will be provided to the CRCRC.

The retry management controller 113 is connected to the command queue 104 to implement or cause the implementation of one or more retries for previously attempted writes of one or more groups of bursts. As discussed previously, the DDR4 specification provides for performing a CRC check at the memory device to compare a received CRC value with a locally computed CRC value and to indicate that there was a CRC error to the memory controller when the two CRC values do not match. This mismatch is indicative of an error in transmission of the data between the memory controller and the memory and suggests that the data received is corrupted and thus should be rewritten. However, there are two issues with this process. First, the DDR4 specification and thus DDR4 memory does not immediately require/provide a failure response to the memory controller. Instead, failure messages are provided at some indeterminate time later. Second, the DDR4 specification and DDR4 memory does not specify/provide for the failure message to include information as to which write command failed the CRC. This presents two problems: (1) the response, if it is to occur, will occur sometime after the write has finished executing; and (2) the failure response does not indicate which write operation failed; any write operation within a time window may correspond to the failed write operation.

To address the problems indicated above, the retry management controller maintains cached write commands and corresponding timing information for performing time-based analysis such as when the commands were transmitted (e.g. using a cycle counter). Additionally, the retry management controller uses time-based analysis techniques to maintain a configurable timing window, e.g. using a rolling time window having configurable start time and end time corresponding to a number of clock cycles. The configurable time window can then be used to determine what entries if any can be retired, such as by removal of entries from the queue, by marking entries as dead, or by marking storage locations of the entries as available to be overwritten. In some embodiments, the retry management controller 113 includes a retry cache 114 for separately storing write commands for possible retry writes. However, in some embodiments the retry management controller may be used to manage a modified command queue, wherein the command queue (e.g. command queue 104) is enlarged to include a number of additional entries and fields for storing write commands after execution by the command module 106 but before expiration of a corresponding time window associated with each entry.

As illustrated, the retry management controller 113 includes a retry cache 114. The retry cache provides for storage of write commands and their corresponding data to be written in one or more storage areas, e.g. a traditional cache, table, FIFO, stack, queue or any other data structure including one or more flags for indicating the status of each entry and for maintaining address information and data, whether separately or together. In some embodiments, the retry cache 114 is configurable to hold burst groups of different sizes, e.g. groups of 2, 4, 6, 8, etc. bursts, and configurable to hold a different number of those groups depending on the needs of a system, apparatus, application, process, or some combination thereof, where the size of the burst group corresponds to both the resolution of the retry time window and the additional burden placed on the command queue. For instance, a write command corresponding to 32 bursts is divided into 4 groups of 8 bursts by the command splitter 111, and stored in the command queue. The divided write command thus corresponds to 4 entries in the command queue where it previously may have corresponded only to 1 entry. Additionally, just prior to issuance of each respective burst group, the respective burst group is stored in the cache (retry cache 114) of the retry management controller 113. Subsequently, all the bursts are similarly treated and executed by the command execution module 106. Further memory access operations are then executed before the sliding time window overlaps with some number of the 4 groups of 8 bursts. If the time window passes without receipt of a corresponding CRC failure message, the 4 groups of bursts can be retired from the queue (e.g., by deletion, marking the entries as dead, or some other method). If a corresponding failure message is received, then the retry management controller 113 uses the sliding time window and the cached information to determine which write commands need to be retried. In some embodiments, the time window and the group size (e.g. number of bursts in a group) are adjustable for the CRCRC. Decreasing the number of bursts in the groups of bursts allows for a more granular selection of the bursts that need to be retried. However, this places a higher burden on the command queue and may decrease throughput as longer bursts are more efficient than smaller bursts, at least if transmission reliability is ignored. In some embodiments, the groups of bursts remain in the command queue and are marked with additional data representing execution timing information (e.g. issuance time, execution time, time of completion of execution).

Retrying of write commands can be implemented by the retry management controller 113. In some embodiments, this may include pausing the command queue 104 and placing one or more groups of bursts (e.g. groups of bursts to be retried) at the front of the command queue and then issuing those burst writes either before or after unpausing the command queue. However, more details of this process will be discussed with regard to subsequent figures. In some embodiments, the entries are stored in the command queue for reissuance. Thus, the retry management controller may re-active the stored groups of bursts already in the command queue and assign those commands to the front of the queue.

The command delay controller 112 addresses two additional issues that arise in this context. The first issue occurs when the retry cache is full and thus cannot accept/store additional write command information in the corresponding cache. This may occur for any number of reasons, including for example, because the retry cache has a smaller number of entries than the maximum number of writes that can be issued while waiting for a possible CRC failure message. Additionally, this can occur when additional groups of bursts arrive while one or more failed writes are being retried because the retried commands remain in the retry cache pending a possible CRC failure message. To address this, the command delay controller 112 checks, just prior to issuance of a write command, to verify that the corresponding cache has sufficient storage space to accept the write command. If it is determined that there is insufficient storage space, the write command is delayed and the command queue will attempt to select a next command to execute. However, if there is sufficient storage space in the cache, the command delay controller will allow the write command to issue. Thus, the command delay controller signals when a command cannot be executed, when a command can be executed, or some combination thereof. Furthermore, the command delay controller may also address a race condition between a write and a read. Specifically, when a read is received for an address that is associated with a pending write (e.g. one that is stored in the cache and not yet retired), the command delay controller 112 will indicate that the read command cannot be completed at that time and will thus delay it at least until the next cycle. Subsequently, just prior to issuance of the write command, the command delay controller 112 will again determine whether the read command can be issued. The command delay controller 112 will continue to hold back the read command until such time that the corresponding write command has completed successfully or will indicate read failure if the write operation is never completed successfully.

The response verification module 116 is connected to the processor 102 and the command execution module 106. The response verification module 116 receives completion messages from the command execution module once the command execution module has finished executing. The response verification module 116 holds back at least the responses corresponding to write operations until a corresponding sliding time window has passed for the given write operation. In some embodiments, when a CRC failure message is received, the response verification module 116 will hold the response until at least one retry attempt has been completed and the time window for the retry attempt has passed without a subsequent CRC failure message.

The memory 108 corresponds to any memory that operates at least partially as discussed. For instance, the memory 108 comprises a DDR4 memory that implements a CRC by computing a local CRC value and comparing that locally computed CRC value to a received CRC value and issuing a failure message when the values do not match.

Figure 2:
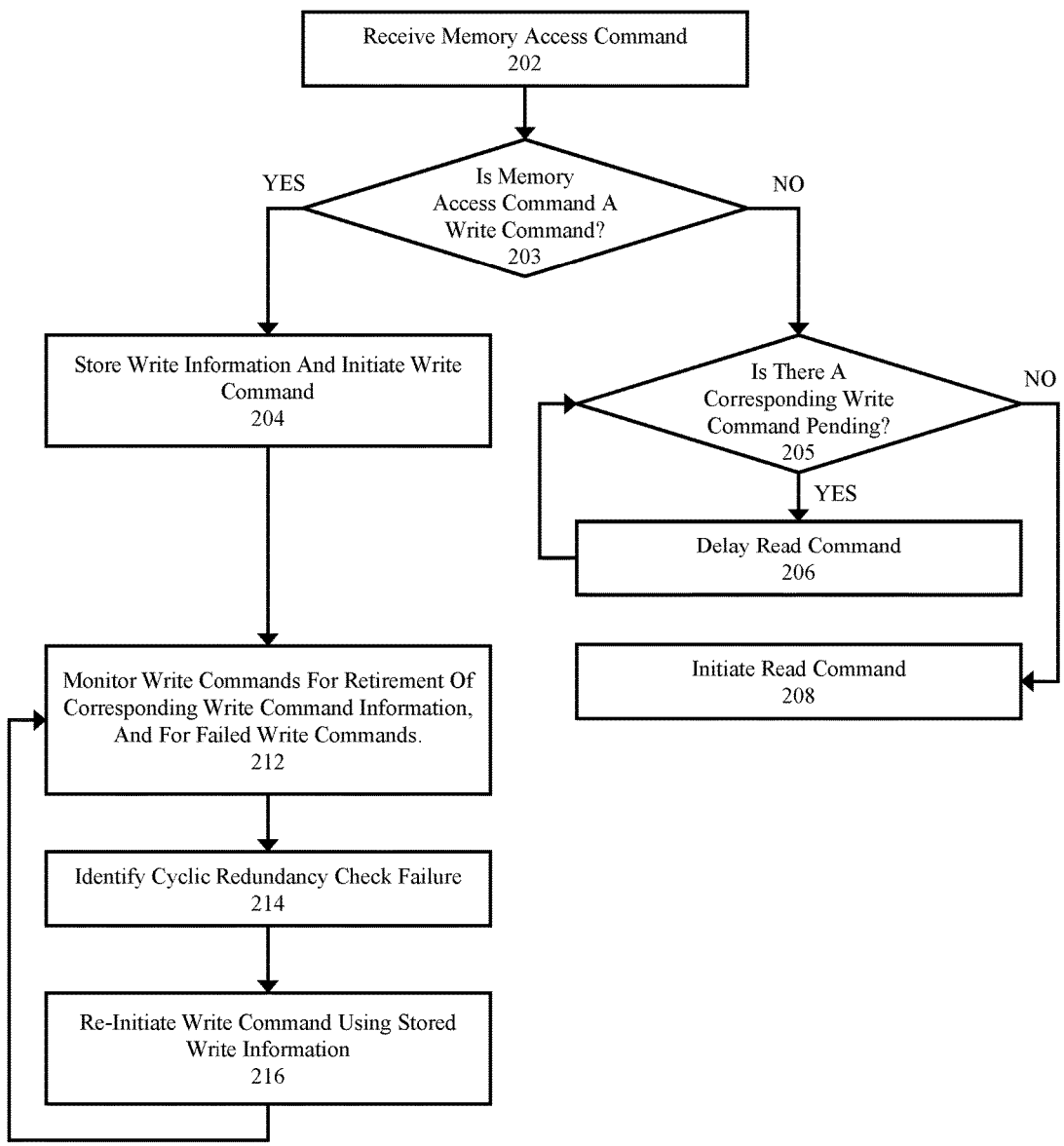
FIG. 2 illustrates a retry process flow according to some embodiments of the invention.

FIG. 2 illustrates a retry process flow according to some embodiments of the invention. The process generally includes receiving a memory access command, storing and monitoring write commands for a failure indication, and executing read commands where the read commands are delayed when they correspond to a pending write command.

The process starts at 202 where one or more read/write commands are received. The read/write commands are generated as a result of one or more memory access commands as is known in the art. For instance, a processing element might request a piece of data from a local cache, which in turn may generate a corresponding command to the memory controller when the piece of data is not found within a cache. Furthermore, the processor might know what data it expects to read/write or otherwise access next and might thus generate one or more additional requests corresponding to a first request.

At 203 a determination is made as to whether the memory access command is a write command. If the command is a write command, the write command is processed as illustrated on the left side of the illustration as indicated by at least 204, 212, 214, and 216. Whereas, if the command is not a write command (e.g., a read command), the command is processed at least as illustrated on the right side of the diagram as indicated by at least 205, 206, and 208. For instance, the command splitter 111 could receive the command, determine what type of command it is (e.g. a read or write command), and transmit it to the command queue 103.

If the command is a write command, the write command will be stored to be potentially retried in the event of a CRC failure and executed against a memory. Corresponding steps will be discussed in further detail in regards to FIG. 3. However, for the sake of clarity the operation generally includes storing at least information sufficient to repeat the operation and storing information corresponding to when the operation was executed.

At 212 monitoring write commands is started to detect for retirement of corresponding write command information and for failure of those write commands. As discussed previously, the stored write command information can be monitored using information corresponding to both a sliding time window and at least an execution time. For example, the write commands information can be monitored by the retry management controller 113 using a cycle counter to identify when the command was executed, to determine how many cycles have passed since the execution of the corresponding instruction, and to determine whether the number of cycles fall within, before, or after the sliding time window, where a corresponding instruction executed before the sliding time window can be retired (e.g. removed from the retry cache 114 or marked to indicate expiration of the entry within the retry cache 114).

When a CRC failure is identified at 214, the process will trigger the re-initiation of one or more write commands corresponding to the CRC failure at 216. Additional details will be discussed below with regards to in FIG. 4. However, generally re-initiation includes selecting previously executed write commands to be re-executed that were previously executed during a corresponding identified time window.

If, at 203, the memory access command is not determined (e.g by the command splitter 111) to be a write command, but is instead a read command, the process continues at 205. At 205 a determination is made as to whether the read command corresponds to a pending write command. For instance, the command delay controller 112 uses the address associated with the read command can be compared to addresses associated with stored write commands, whether in the command queue or cached. If the address of the read command corresponds to an address of a stored write command, e.g. the read command overlaps with the write command in full or in part, then the read operation will be delayed at 206 until the write operation has completed—and potentially cancelled if the write command does not complete successfully. However, if it is determined at 205 that the read command does not overlap with a stored write command, then the read may be initiated normally at 208.

Figure 3:
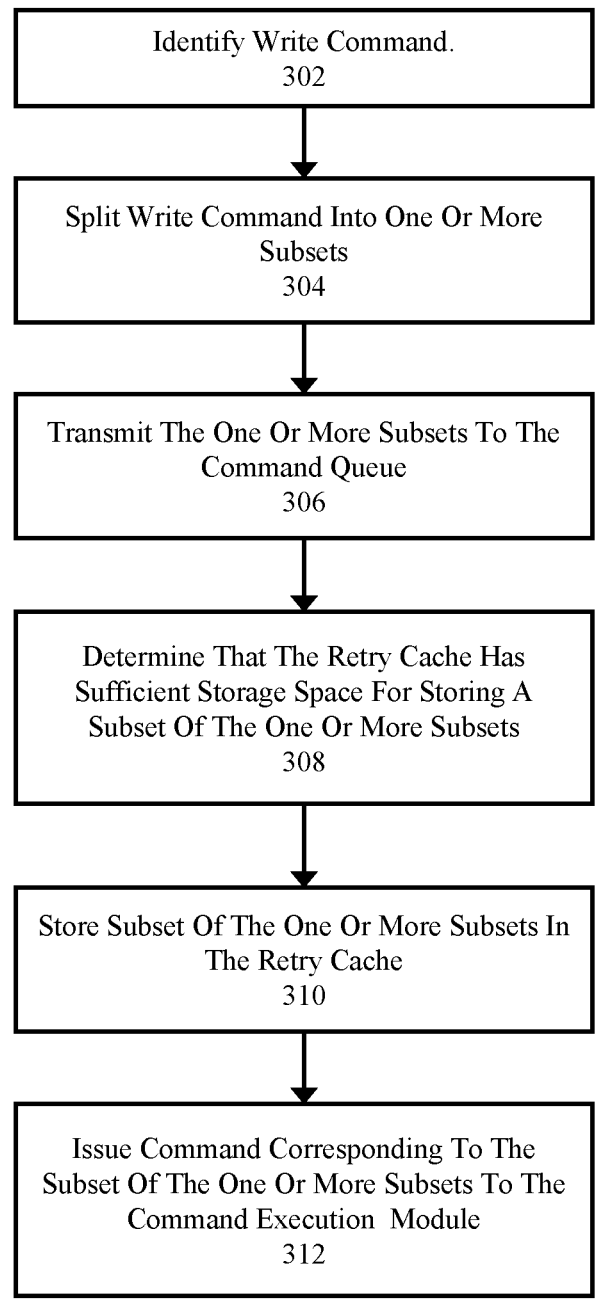
FIG. 3 illustrates an expanded view of the process of storing write information and initiating write commands shown in FIG. 2 according to some embodiments of the invention.

FIG. 3 illustrates an expanded view of the process of storing write information and initiating write commands shown in FIG. 2 according to some embodiments of the invention.

The process starts at 302 where the write command is identified (e.g. by the command splitter 111). Once the write command is identified, it is split into write commands corresponding to one or more subsets at 304. For instance, the memory controller may be configurable to split write commands into groups of 2, 4, 6, 8, 12, 14, 16 or any other number of bursts supported by the memory device being accessed, using the command splitter 111. As discussed previously, smaller groups may lower the throughput of the memory device while providing for more accurate retry selection, while larger groups may a provide for higher throughput at the expense of accuracy in the retry selection, where the accuracy here corresponds to the granularity of the selection of data to be re-written after a failed write operation. Once the write command is split into one or more groups of bursts, the groups of bursts are transmitted to a command queue for issuance to an execution unit.

At 308 a determination is made as to whether the retry cache has sufficient storage space to hold the write command information during/after execution of the write command. For example, a retry cache is configured to hold 6 groups of 8 bursts and is being used to store write command subsets (e.g. groups of bursts comprising 8 bursts), where the retry cache is checked to determine whether there is sufficient storage space to hold the selected write command subset by the command delay controller. If all 6 slots are filled by pending write instructions, the write command subset is held back (e.g. by at the command queue 104 as instructed by the command delay controller 112) and thus does not issue the selected write command subset (e.g. to the command execution module 106). However, if there is an available slot in the cache to hold the write command subset then the write command subset is allowed to issue to an execution unit (e.g. to the command execution module 106).

At 310, the write command subset is stored in the cache (e.g., the cache that was checked in step 308 above) either before or during issuance. For instance, the retry management controller 113 receives and stores write command subsets in the retry cache, or the retry management controller updates write command subset entries already in the command queue to indicate the status of the write command subset and to maintain the entry in the corresponding storage area. Furthermore, the write command subset or corresponding information thereof is issued to the execution unit for execution, potentially at the same time the write command subset is being stored or updated by the retry management controller 113. Additionally, timing information corresponding to the time of execution of the write command is also captured at issuance by the retry management controller 113. For example, the timing information is captured using a clock counter and storing a clock counter value at the time of execution of the instruction within the cache. The stored timing information enables the determination of how many cycles have passed at some future point in time for purposes of determining whether a corresponding write command subset should be retirement from the cache and for determining if the write command subset corresponds to a received CRC failure message.

Figure 4:
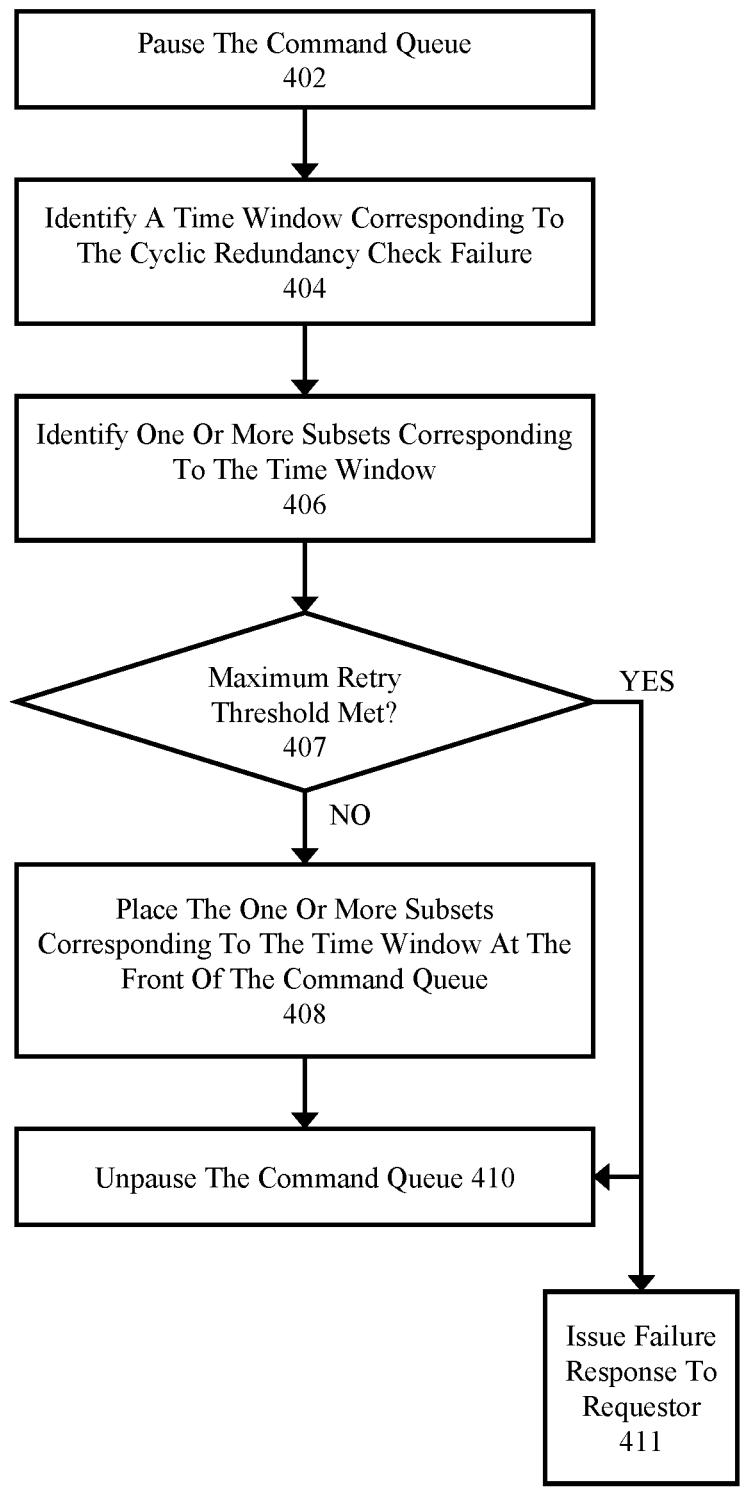
FIG. 4 illustrates an expanded view of the process to re-initiate write commands using stored write information shown in FIG. 2 according to some embodiments of the invention.

FIG. 4 illustrates an expanded view of the process to re-initiate write commands using stored write information shown in FIG. 2 according to some embodiments of the invention. Generally, this process includes identification of one or more instructions to be retried and selection and reissuance of those instructions while remaining commands already received are held back from being executed.

The process starts at 402 where the command queue is paused. For example, the command queue 104 is paused by the retry management controller 113 because a message indicating a failed CRC is received from a coupled memory device (e.g. memory 108). Pausing the command queue includes, for example, stopping the command queue from issuing any instructions already in the command queue 104 to an execution unit (e.g. command execution module 106) or from issuing any instructions that are not retry instructions. For instance, when a full command queue comprising some combination of read and write instructions is paused no further instructions will be allowed to issue from the command queue to an execution unit. However, one possible circumstance includes receiving a failure message while an execution unit is in the process of executing a read or write command. If the execution unit (e.g. command execution module 106) is in the process of executing a command, then that command is allowed to complete.

At 404 a time window corresponding to the CRC failure is identified (e.g. by the retry management controller 113). There are multiple ways in which the time window can be determined. First, the time window can be identified based at least in part on designer/manufacturer provided parameters (such as an earliest start time and latest end time as determined by a designer prior to manufacture or by one or more tests performed after manufacture). Second, the time window can be identified based at least in part on a provided specification document (such as in a technical manual). Third, the time window can be identified based at least in part or based on a handshake/calibration sequence performed between the memory controller and the memory. For example, a time window may be determined using a specified minimum cycle count and a maximum cycle count comprising respective numbers of clock cycles. For instance, a cycle counter that is incremented each clock cycle is used to indicate when write commands are executed (by updating a corresponding entry with a current cycle counter value at the time of execution), and upon receipt of a failure message capturing the current cycle counter value for identification of a specific position of a sliding time window. Here, the specific position of the sliding time window is a range between/including the captured current cycle counter value less the minimum cycle count and the captured current cycle counter value less the maximum cycle count. The range can then be used to identify previously executed write commands that have a cycle count within the range. Regardless of how the time window is determined, at 406 one or more write command segments (e.g. the groupings of write commands comprising some number of bursts) are identified. For example, the write commands in position 1-3 of a queue are identified for potentially being retried.

At 407, a maximum retry threshold is compared against retry counts for write commands to determine if the maximum retry threshold has been met for any write commands (e.g. at the retry management controller 113), and if so the corresponding write commands should not be retried. For example, a threshold of 2 would mean that if the write command subset has already been retried twice (e.g. the write was executed unsuccessfully three times), the write command subsets would not be retried a third time. Instead, the process would continue at 411 where a failure response would be sent to the original write requestor. However, if the maximum retry threshold has not been met, the process will continue at 408. In some embodiments, the retry count corresponds to a single bit of respective entries for cached write command subsets where only one retry attempt can be made for each respective write command subset. In some embodiments, multiple retry attempts may be performed as represented by multiple bits corresponding to respective entries for cached write command subsets. Furthermore, in some embodiments the maximum retry threshold will be applied on a per write command subset basis.

At 408, the write command subsets (e.g. the one or more subsets of an originally received write command) may be placed on the command queue for issuance. In some embodiments, a single entry in the command queue is reserved for use in retrying write command subsets. For instance, the single entry in the command queue 104 could be populated with the oldest of the identified write command subsets in the retry cache 114, and the reserved entry could then issue the write command to the command execution module 106, where the single entry is subsequently populated with the next oldest write command subset from the retry cache 114. This is followed by issuance of the next oldest write command subset from the command queue 104 to the command execution module 106 and repopulation with what is then the next oldest write command subset, and so on, until all the reissue commands have been transmitted to the command execution module 106 and executed. In some embodiments, the command queue has a number of entries reserved for retrying write commands, where those entries are populated with and correspond to the number of retry commands that can be associated with a particular CRC failure message. Additionally, in some embodiments the write command subsets to be retried are added to the command queue and given priority over the other commands. Under either circumstance, the write command subsets are either (1) retried while the command queue is paused or (2) are given priority over other commands in the command queue and executed after the command queue is unpaused at 410. Additionally, since the write command subsets are already stored in the appropriate storage location (e.g. retry cache 114), the command delay controller 112 does not need to delay the commands and may even forgo checking those commands entirely. Instead, the retry management controller can merely perform an update to the stored information reflecting the number of retry attempts and the time of the latest retry attempt.

Figure 5:
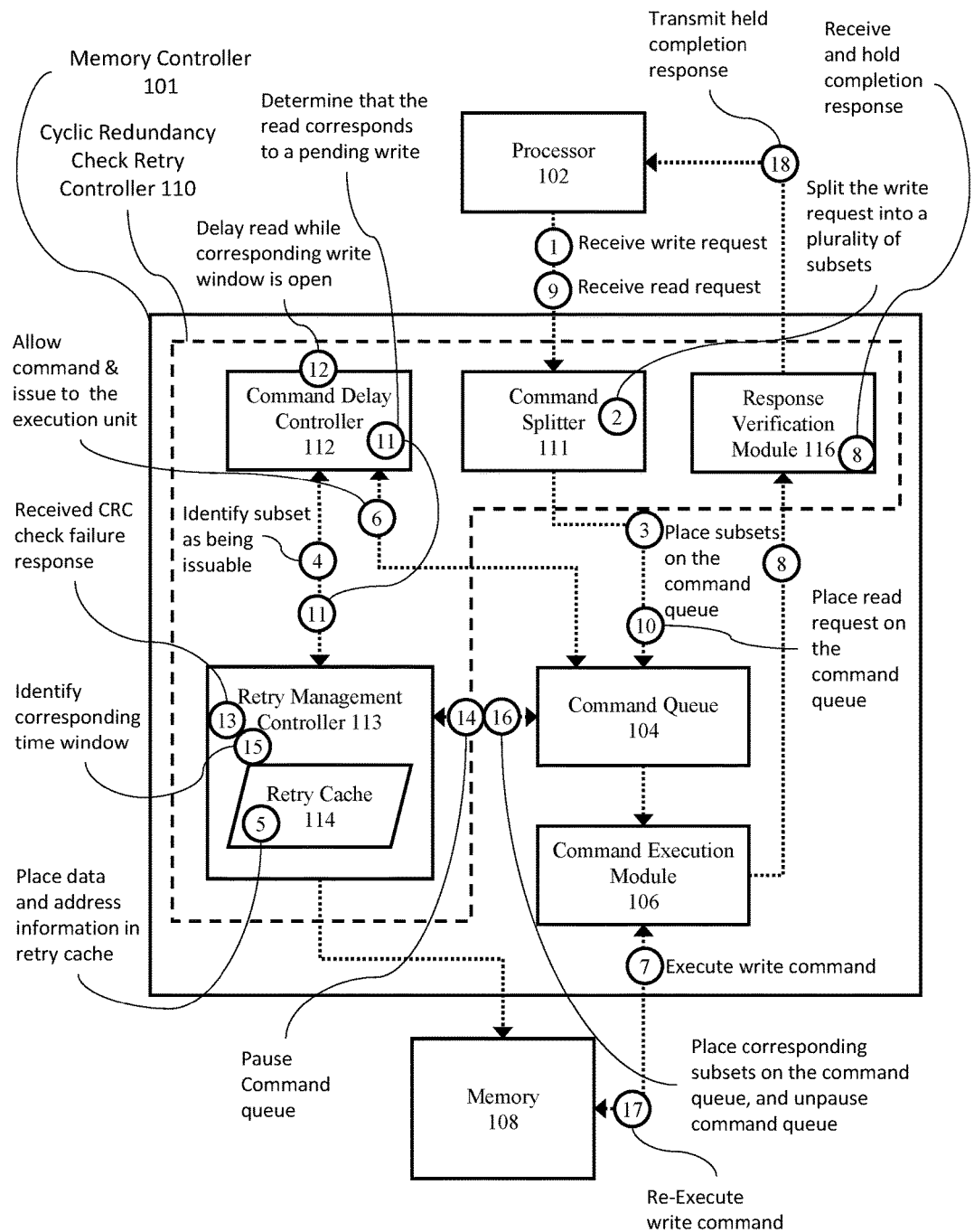
FIG. 5 illustrates an example operation of a memory controller in which some embodiments of the invention may be implemented.

FIG. 5 illustrates an example operation of a memory controller in which some embodiments of the invention may be implemented. Specifically, FIG. 5 illustrates an example sequence of steps performed during operation according to one embodiment. Furthermore, unless expressly stated below the corresponding description of the identified elements of FIG. 1 apply to like referenced elements of FIG. 5.

The process starts at 1 where a write request is received. The write request is received from the processor 102. However, as discussed previously the write request could also be received from a DMA engine, a cache management element, another processor, modem, or any other device that could issue a write command.

At 2 the write request is split into the designated number of bursts. For instance, the write request may correspond to 32 bursts, and be split into 4 groups of 8 bursts and transmitted to the command queue at 3. As previously discussed, the specific groupings can be modifiable by a designer, manufacturer, user, or automated system process to balance the effect of the retry feature with the effects on memory throughput.

A respective group of bursts of the groups of bursts will eventually attain the highest priority in the command queue, whether by moving position such as in a FIFO buffer or by some numerical management process such as by rank. When the respective group of bursts has reached the highest priority, the command delay controller 112 will verify that there is sufficient storage space in the retry cache (e.g. by polling the retry management controller 113 retry cache 114). If there is insufficient storage space, the command delay controller 112 orders the command queue 104 to hold back from issuing the respective group of bursts. However, for the sake of illustration in this example, assume that there is sufficient storage space in the retry cache 114, and thus the respective group of bursts are stored in the retry cache. Additionally, at 6 the command queue 104 receives an order to allow the respective command to issue (or lack of an order to hold back the write command) and issues the respective group of bursts to the command execution module 106. Steps 5 and 6 may happen simultaneously or may happened sequentially.

At 7, the respective write command is issued to the memory 108 by the command execution module 106. Upon completion, the command execution module 106 generates a write completion message that is, at 8, transmitted to and held by the response verification module 116. As previously discussed, the response verification module 116 holds the write completion message until the corresponding entry in the retry cache 114 expires without a CRC failure message.

While the time windows for the respective group of bursts are passing (e.g. after execution), additional memory access commands are received by the memory controller. For example, at 9 a read request is received and, at 10, passed through the splitter without alteration to the command queue 104. The read request acquires a position/rank in the queue such that the read command is next to be issued to the execution unit. At 11, the command delay controller accesses the retry cache 114 of the retry management controller 113 to determine if the read overlaps with a write stored in the retry cache that has not yet been retired. For example, the address range of the read operation is determined and compared to the address ranges of stored write operations in the retry cache 113 not marked as expired or otherwise marked as valid. If there is no overlap, then the read command is determined to be issuable and issuance is allowed (either by express allowance communication by the command delay controller 112 to the command queue 104 or by failure to generate a hold back signal by the command delay controller 112). However, it is assumed for this illustrative example that the received read request corresponds to a stored write request and thus the read command will be delayed at 12 by the command delay controller.

At 13, the retry management controller 113 received a CRC failure message. For instance, the retry management controller 113 received the CRC failure message passed through the command execution module 106. In response to receiving the CRC failure message, the retry management controller 113 issues a pause command to the command queue, which subsequently stops issuing new commands to the command execution module 106 while the command execution module finishes executing any already in progress commands. While the command execution module 106 completes the execution of any already in progress commands, the retry management controller 113 identifies a time window corresponding to the CRC failure message at 15, and at 16 places the corresponding write command subsets on the command queue and unpauses the command queue. For example, as previously discussed, the retry management controller issues a first write command subset into a reserved entry in the command queue and the command queue issues write commands from the reserved entry even if the normal operation of the command queue is paused. Furthermore, as each write command subset is issued to the execution unit, a next write command subset is placed in the reserved command queue entry(ies) until all write command subsets corresponding to the time window have be retried at 17 by the command execution module. Additionally, because the write command subsets are already stored in the retry cache 114, the command delay controller does not perform a check to see if there is sufficient storage space in the queue.

As previously discussed the response verification module 116 will hold the write completion message while the corresponding write command is pending. Thus, at 18 the response verification module 116 will transmit the held completion response after the time window has passed for receiving a corresponding CRC failure message. Furthermore, while not illustrated here, the received read request will no longer be delayed by the command delay controller 112 once the corresponding entry is retired from the command queue.

Therefore, what has been described is an improved mechanisms and method for a coherent, efficient, and configurable cyclic check redundancy retry implementation for synchronous dynamic random access memory. The apparatus and method provide for determining write command subsets corresponding to received CRC failure messages using time-based analysis techniques, where those failure messages do not specify which write command subset corresponds to a respective failure message, and where those failure messages do not have a determinate timing relationship to corresponding write command subsets. Furthermore, the improved mechanisms and method include holding back corresponding completion messages until a cyclic redundancy check failure message will no longer be receive, or where appropriate replaced of completion messages with failure messages after some maximum number of retry attempts have completed without success. Furthermore, the improved mechanisms and methods also provide a configuration retry cache for storing groups of bursts, wherein the retry cache is configurable to hold different numbers of entries and different arrangements of entries.

System Architecture Overview

Figure 6:
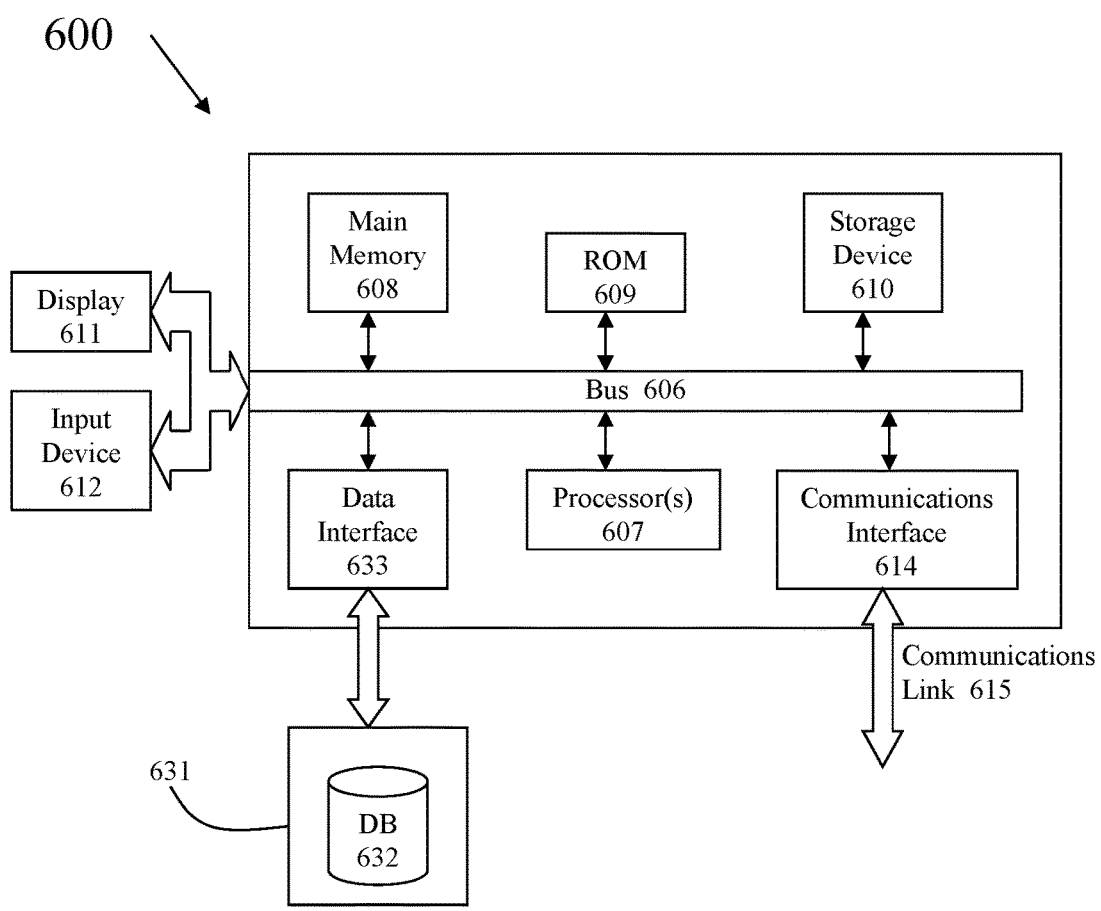
FIG. 6 is a block diagram of an illustrative computing system suitable for implementing an embodiment of the present invention.

FIG. 6 is a block diagram of an illustrative computing system suitable for implementing an embodiment of the present invention. The illustrated main memory 608 may correspond to the recite memory controller 101 and to the memory 108. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control.

According to one embodiment of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, e.g., application code, through communication link 615 and communication interface 614. Received program code may be executed by processor 607 as it is received, and/or stored in disk drive 610, or other non-volatile storage for later execution. Computer system 600 may communicate through a data interface 633 to a database 632 on an external storage device 631.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing a cyclic redundancy check retry process at a memory controller, comprising:
   receiving a write command at a memory controller;
   storing one or more entries corresponding to the write command in a temporary storage location;
   executing at least some of the one or more entries corresponding to the write command at the memory controller, the write command specifying storage of a first set of data at a memory; and
   monitoring the memory at the memory controller, the memory being monitored to identify received cyclic redundancy check failure messages that correspond to entries of the one or more entries, wherein a time-based analysis is performed to correlate the received cyclic redundancy check failure messages to specific entries of the one or more entries.

2. The method of claim 1, further comprising:
   identifying a cyclic redundancy check failure in response to receiving a message from the memory; and
   retrying execution of selected entries at the memory controller using the temporary storage location.

3. The method of claim 2, wherein the selected entries at the memory controller comprise entries in the temporary storage location that overlap with a sliding time window.

4. The method of claim 3, wherein the selected entries are only entries that have not previously been retried a threshold number of times.

5. The method of claim 1, further comprising:
   receiving a read command at the memory controller;
   determining that the read command corresponds to at least one valid entry in the temporary storage location; and
   holding back the read command from execution while the read command corresponds to at least one valid entry in the temporary storage location.

6. The method of claim 5, further comprising:
   managing the temporary storage location using a sliding time window, the sliding time window corresponding to an earliest possible arrival of a respective write failure message and a latest possible arrival of the respective write failure message; and
   retiring entries in the temporary storage location when no corresponding write failure message is received while the sliding time window overlaps with a respective entry, wherein retiring entries comprises deleting entries, marking entries invalid, marking a location of the entries as available, or marking the entries as retired.

7. The method of claim 6, further comprising: holding back write response success messages at the memory controller while the temporary storage location has unretired entries corresponding to the write command.

8. The method of claim 6, wherein the write failure message indicates that a cyclic redundancy check failure occurred at the memory.

9. The method of claim 1, further comprising:
   splitting the write command into one or more groups of bursts to be stored as one or more entries, the one or more groups of bursts comprising no more than a threshold number of bursts.

10. The method of claim 9, wherein the temporary storage location has a configurable number of entry locations and the entry locations have a configurable width corresponding to the threshold number of bursts, wherein the number of entry locations and the configurable width is based on at least one system parameter, apparatus parameter, application parameter, process parameter, or some combination thereof.

11. An apparatus implementing a cyclic redundancy check retry process at a memory controller, comprising:
    a memory controller, the memory controller receiving a write command, storing one or more entries corresponding to the write command in a temporary storage location, executing at least some of the one or more entries corresponding to the write command, the write command specifying storage of a first set of data at a memory, and monitoring the memory at the memory controller, the memory being monitored to identify received cyclic redundancy check failure messages that correspond to entries of the one or more entries, wherein a time-based analysis is performed to correlate the received cyclic redundancy check failure messages to specific entries of the one or more entries.

12. The apparatus of claim 11, wherein the memory controller further performs identifying a cyclic redundancy check failure in response to receiving a message from the memory, and retrying execution of selected entries at the memory controller using the temporary storage location.

13. The apparatus of claim 12, wherein the selected entries at the memory controller comprise entries in the temporary storage location that overlap with a sliding time window.

14. The apparatus of claim 13, wherein the selected entries are only entries that have not previously been retried a threshold number of times.

15. The apparatus of claim 11, wherein the memory controller further performs receiving a read command, determining that the read command corresponds to at least one valid entry in the temporary storage location, and holding back the read command from execution while the read command corresponds to at least one valid entry in the temporary storage location.

16. The apparatus of claim 15, wherein the memory controller comprise a retry management module, the retry management module managing the temporary storage location using a sliding time window, the sliding time window corresponding to an earliest possible arrival of a respective write failure message and a latest possible arrival of the respective write failure message, and retiring entries in the temporary storage location when no corresponding write failure message is received while the sliding time window overlaps with a respective entry, wherein retiring entries comprises deleting entries, marking entries invalid, marking a location of the entries as available, or marking the entries as retired.

17. The apparatus of claim 16, wherein the memory controller further performs holding back write response success messages at the memory controller while the temporary storage location has unretired entries corresponding to the write command.

18. The apparatus of claim 13, wherein the write failure message indicates that a cyclic redundancy check failure occurred at the memory.

19. The apparatus of claim 11, wherein the memory controller further performs splitting of write commands into one or more groups of bursts to be stored as one or more entries, the one or more groups of bursts comprising no more than a threshold number of bursts.

20. The apparatus of claim 19, wherein the temporary storage location has a configurable number of entry locations and the entry locations have a configurable width corresponding to the threshold number of bursts, wherein the number of entry locations and the configurable width is based on at least one system parameter, apparatus parameter, application parameter, process parameter, or some combination thereof.

\* \* \* \* \*